US 6,659,698 B2

(12) United States Patent
Kirchen et al.

(10) Patent No.: US 6,659,698 B2
(45) Date of Patent: Dec. 9, 2003

(54) TORQUE RESISTANT GROMMET

(75) Inventors: James T. Kirchen, Chippewa Falls, WI (US); Steve Everard, Ean Claire, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/109,787

(22) Filed: Mar. 28, 2002

(65) Prior Publication Data

US 2003/0185650 A1 Oct. 2, 2003

(51) Int. Cl.$^7$ .......................... F16B 31/00; F16B 37/04
(52) U.S. Cl. .......................... 411/7; 411/182; 411/432; 411/508
(58) Field of Search ................ 411/2–7, 178, 411/180, 182, 432, 508, 509, 913, 970

(56) References Cited

U.S. PATENT DOCUMENTS

| | | | |
|---|---|---|---|
| 3,425,314 A | * | 2/1969 | Ohlson ........................ 411/7 |
| 3,534,797 A | * | 10/1970 | Reinhard et al. ....... 411/182 X |
| 3,841,177 A | | 10/1974 | Watterback .............. 81/52.4 R |
| 3,893,365 A | | 7/1975 | Gross |
| 4,026,187 A | | 5/1977 | Gross |
| 4,082,030 A | | 4/1978 | Erickson |
| 4,136,599 A | | 1/1979 | Hammer, Jr. |
| 4,176,582 A | * | 12/1979 | Witte ............................ 411/7 |
| 4,208,944 A | | 6/1980 | Moryl |
| 4,306,708 A | | 12/1981 | Gassaway et al. |
| 4,432,680 A | | 2/1984 | Molina |
| 4,743,152 A | | 5/1988 | Nakayama et al. ......... 411/182 |
| 4,761,860 A | | 8/1988 | Krauss |
| 4,762,437 A | | 8/1988 | Mitomi |
| 4,840,522 A | | 6/1989 | Kurihara |
| 4,971,500 A | | 11/1990 | Benoit et al. |
| 5,069,586 A | | 12/1991 | Casey |
| RE33,809 E | | 1/1992 | Okada et al. |
| 5,083,890 A | | 1/1992 | Gabilondo |
| 5,178,500 A | | 1/1993 | Stencel |
| 5,295,652 A | | 3/1994 | Byrne |
| 5,779,409 A | * | 7/1998 | Manzolli ....................... 411/7 |
| 6,213,700 B1 | | 4/2001 | Everard |
| 6,233,782 B1 | | 5/2001 | Regele et al. |
| 6,244,805 B1 | | 6/2001 | Everard ....................... 411/182 |
| 6,350,093 B1 | * | 2/2002 | Petersen et al. ........ 411/178 X |
| 6,416,267 B1 | | 7/2002 | Nehl .......................... 411/30.5 |

FOREIGN PATENT DOCUMENTS

DE  198 55 139 A1  5/2000

* cited by examiner

*Primary Examiner*—Neill Wilson
(74) *Attorney, Agent, or Firm*—Mark W. Croll; Paul F. Donovan

(57) ABSTRACT

A grommet having a body formed of an inner sleeve and an outer sleeve wherein the inner sleeve may be made to spin within the outer sleeve upon the application of a torqueing force that exceeds a predetermined release torque is herein disclosed. The grommet has a head attached to the body thereof to limit the insertion of a shank of the grommet into an aperture formed in a primary panel and a retaining structure formed into the outer surface of the shank to permit the grommet to be pre-assembled with the primary panel.

27 Claims, 1 Drawing Sheet

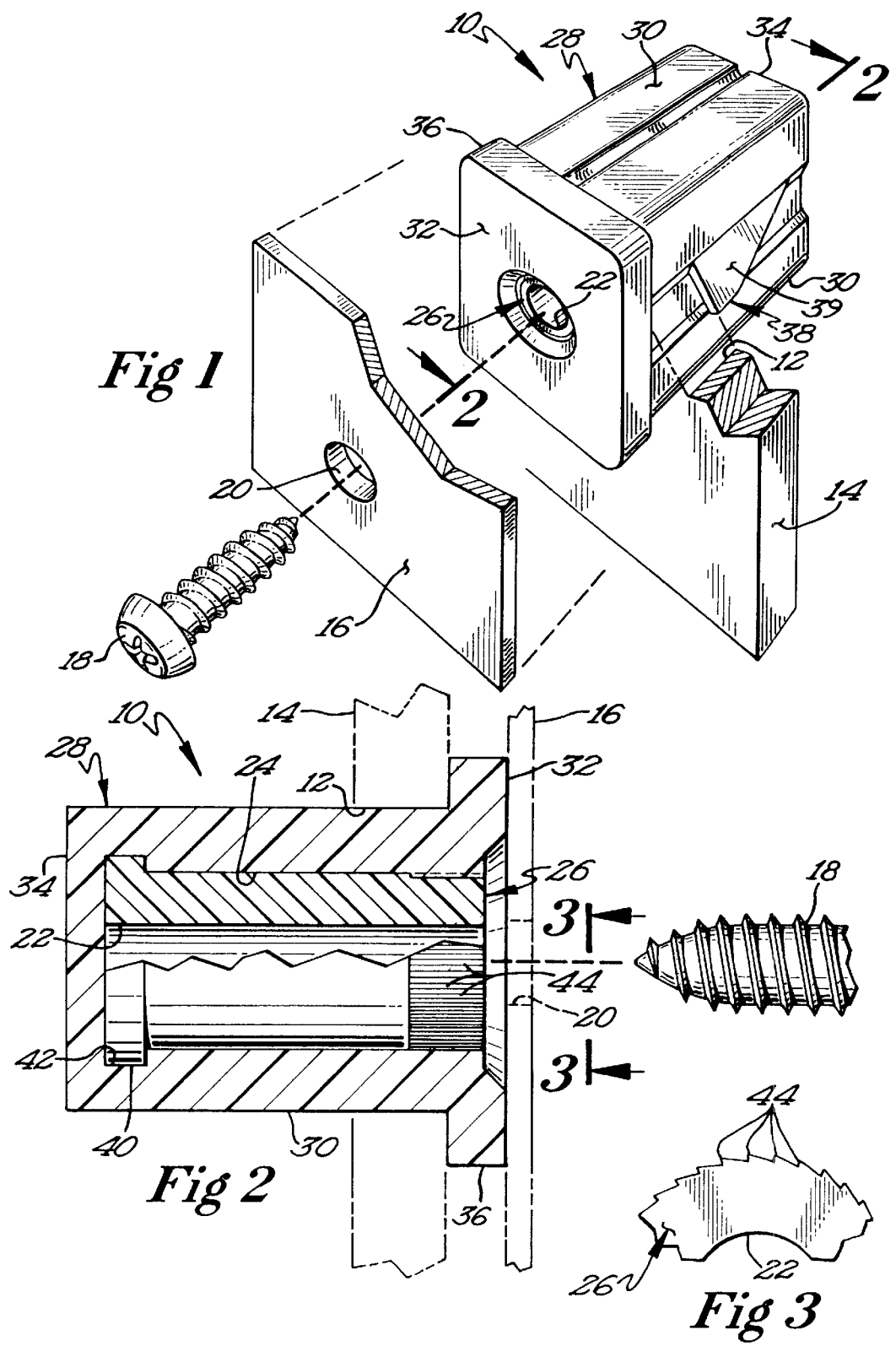

TORQUE RESISTANT GROMMET

FIELD OF THE INVENTION

The present invention relates to a torque resistant grommet that permits the use of relatively high torque settings in driving fasteners thereinto.

BACKGROUND OF THE INVENTION

When connecting a part to a sheet metal framework, such as in the installation of automobile parts and accessories, it is common to use an expandable grommet inserted into an aperture formed through a primary panel of the sheet metal framework. A threaded fastener such as a standard screw is passed through the part and driven into the expandable grommet. As the threaded fastener is driven into the grommet, the shank of the grommet expands, thereby preventing the grommet from being extracted from the aperture in the primary panel. Unfortunately, grommets of this type are typically manufactured from relatively soft and inexpensive materials such as polyethylene, nylon, and the like. Consequently, the application of high levels of torque to a threaded fastener being driven into a grommet all too frequently exceeds the level of torque at which the fastener strips out the interior of the grommet, thereby preventing a good hold between the threaded fastener and the grommet.

Accordingly, it is desirable to provide a torque resistant grommet that may be pre-assembled with a primary panel of a structure such as an automobile frame, that is resistant to spinning within an aperture into which it is received so as to allow a threaded fastener to be driven thereinto, and which is furthermore resistant to the stripping of interior of the grommet.

SUMMARY OF THE INVENTION

A grommet constructed according to the principles of the present invention has a shank and a head that extends laterally therefrom. The shank is constructed and arranged for-retained insertion in an aperture formed in a structure and the head of the grommet acts to limit the insertion of the shank into the aperture.

The shank itself is made up of an inner sleeve and an outer sleeve. The outer sleeve forms the exterior of the shank and the interior sleeve is disposed within the outer sleeve. The inner sleeve has a bore formed therein that is constructed and arranged to threadedly receive a threaded fastener. In addition, the inner sleeve is secured within the outer sleeve such that a predetermined torque level, referred to as a release torque, will cause the inner sleeve spin within the outer sleeve. This spinning action limits the amount of torque that a threaded fastener may exert on the inner sleeve of the grommet. As the release torque is preferably set below the level of torque at which a threaded fastener will strip out threads formed in the bore of the inner sleeve, the spinning inner sleeve prevents stripping of the grommet.

The shank preferably has a cross-sectional shape that is complementary to the shape of the aperture of the structure into which the grommet is inserted. What is more, the shank of the grommet will be constructed and arranged to resist spinning within the aperture.

Another feature of the present invention is the inclusion of at least one retaining structure on the shank of the grommet. This retaining structure acts to retain the shank of the grommet within the aperture so that the grommet may be pre-assembled with the structure into which the aperture is formed. The retaining structure may take many forms, among which are included a flexible vane, a flexible finger, a ramped projection, an outwardly extending ridge, and a plurality of annular projections.

In order to ensure that the inner sleeve of the grommet shank is not pulled from the outer sleeve of the grommet after the release torque has been exceeded, it is preferred to form a laterally projecting collar that extends from a bottom end of the inner sleeve. The collar is retained within a complementarily shaped channel formed on the interior surface of the outer sleeve. In this way, the inner sleeve may rotate within the outer sleeve without being pulled therefrom.

The release torque may be set in many different manners, including, but not limited to adhering the outer sleeve to the inner sleeve, mechanically or thermoplastically securing the outer sleeve to the inner sleeve, and forming on the exterior of the inner sleeve and/or on the interior of the exterior sleeve at least one projection that contacts the other sleeve in such a manner as to prevent relative rotation therebetween. In a preferred embodiment, the outer surface of the inner sleeve has formed therein a plurality of projections that have a lower release torque in a clockwise direction and a higher release torque in a counter-clockwise direction. Alternatively, the higher and lower torque directions may be reversed.

In order to prevent a threaded fastener from stripping the inner sleeve of the grommet and thereby damaging it, it is preferred to form-the inner sleeve of a relatively hard material. And, as the outer sleeve has more need to deform, the outer sleeve will typically be fashioned of a relatively softer material. The grommet may be formed using an over-molding process or a two-shot injection process. Alternatively, the inner sleeve and outer sleeve are formed independent of one another and subsequently assembled.

These and other features and advantages of the invention will appear more fully from the following description, made in conjunction with the accompanying drawings wherein like reference characters refer to the same or similar parts throughout the several views.

DESCRIPTION OF THE DRAWINGS

FIG. 1 is a schematic perspective view of a torque resistant grommet of the present invention in use;

FIG. 2 is a partial cross-section of the torque resistant grommet of FIG. 1 shown inserted into an aperture in a primary panel;

FIG. 3 is a partial cross-sectional view of an interior sleeve of the torque resistant grommet of the present invention.

DETAILED DESCRIPTION

Although the disclosure hereof is detailed and exact to enable those skilled in the art to practice the invention, the physical embodiments herein disclosed merely exemplify the invention, which may be embodied in other specific structure. While the preferred embodiment has been described, the details may be changed without departing from the invention, which is defined by the claims.

FIG. 1 illustrates a torque resistant grommet 10 of the present invention. Grommet 10 is received into an aperture 12 formed through a primary panel 14. A secondary panel 16 may be secured to the primary panel 14 by means of a threaded fastener 18 that is passed through a bore 20 formed through-the panel 16 and into a bore 22 formed into the grommet 10.

FIG. 2 shows a partial cross-section of the grommet 10. The grommet 10 is comprised of an inner sleeve 26 that is surrounded by and received within an outer sleeve 28. It is to be noted that the inner and outer sleeve 26, 28 are distinct structures and not merely different areas of the same object. Together, the inner and outer sleeves 26, 28 form the body of the grommet 10. The grommet 10 has a shank 30 with a top end 32 and a distal end 34. A head 36 extends laterally from the top end 32 of the shank 30. When the shank 30 of the grommet 10 is inserted into an aperture 12, the head 36 of the grommet acts to prevent the grommet from passing entirely through the aperture 12.

The shank 30 of the grommet 10 typically has at least one retaining mechanism 38 extending therefrom that permits the grommet 10 to be pre-assembled with a primary panel 14. The retaining structures 38 may be of any useful form, but in this preferred embodiment comprise a flexible vane 39 that extends laterally from the shank 30. When the shank 30 has been inserted into the aperture 12 until the head 36 bears against the primary panel 14, the retaining mechanism 38, in this case the flexible vane 39, will engage the side of the primary panel opposite the head 36 and prevent the extraction of the grommet 10 from the aperture 12. The retaining mechanism 38 may also be a flexible finger, a ramped projection, an outwardly extending ridge, or a plurality of annular projections. In the preferred embodiment of the present invention, the retaining structure(s) 38 provide the entire means whereby the grommet 10 is retained in the aperture 12. However, where appropriate, the grommet 10 may be constructed and arranged so that its shank 30 expands as a fastener 18 is driven thereinto, thereby preventing the grommet 10 from being extracted from an aperture 10.

The inner sleeve 26 of the grommet 10 defines the bore 22 into which threaded fastener 18 is received. As can be seen, the bore 22 is accessible through the head 36 formed into the outer sleeve 28. The bore 22 may pass entirely through the inner sleeve 26 or may be a blind bore extending only part way into the inner sleeve 26. The bore 22 will have a diameter somewhat smaller than the fastener 18 that is intended to be driven therein and it is preferred that the bore 22 have longitudinal grooves formed therein that allow for deformed material to be displaced as a fastener 18 is driven into the bore 22. However, it is to be kept in mind that the bore 22 may be smooth, have threads, or other types of projections formed therein that facilitate the retention of a fastener therein. In addition, the inner sleeve 26 is preferably fashioned of a material softer than the threaded fastener 28 such that the threaded fastener 18 may cut threads into the interior surface of the bore 22. Where the inner sleeve 26 is made of a material that is harder than the threaded fastener 18, the inner sleeve 26 will be provided with interior threads that mate with the threads of the fastener 18. One example of such an alternate embodiment is where the inner sleeve 16 is threaded insert made of brass, aluminum, steel or the like that is over molded with the exterior sleeve 28.

Generally speaking, the outer sleeve 28 of the grommet 10 is formed of a relatively soft and elastic material. Not only can this material deform so as to adapt to the contours of the aperture 12 and to grip those contours, but as the retaining mechanisms 38 are preferably formed integral to the outer sleeve 28 and from the same material, the retaining mechanisms 38 will be able to resiliently deform as they are inserted into the aperture 12 and yet snap back to perform their retaining function. This softer material also lowers the amount of force needed to insert the grommet 10 into the aperture 12. The inner sleeve 26, on the other hand, must be sufficiently strong to resist the stripping of the bore 24 of the grommet 10. Accordingly, in a preferred embodiment of the present invention, the exterior sleeve 28 will be formed of a material that is relatively softer than the material from which the inner sleeve 26 is formed. It must be remembered, however, that the inner and outer sleeves 26, 28 of the grommet 10 may be formed of the same materials and also that, where so needed, the inner sleeve 26 may be formed of a material that is softer than the exterior sleeve 28. In a preferred embodiment of the present invention, the interior sleeve 26 is made of glass or ceramic filled polyamide such as nylon or an acetal material and the outer sleeve 28 is made of nylon.

As a fastener 18 is driven into the bore 22 formed into the inner sleeve 26, the fastener 18 will impart a torque to the inner sleeve 26 about the axis of rotation of the fastener 18. Preferably, the shank 30 of the grommet 10 will be of a non-circular form. such that the geometry of the shank 10 and that of the complementary aperture 12 will prevent rotation of the grommet 10 within the aperture 12. While the preferred embodiment of the grommet 10 comprises a substantially square shank 30, it is contemplated that the shank 30 may be formed into virtually any shape, including even a circular shape. But where a circular shank 30 is used, care must be taken to ensure that the torque resistant properties of the grommet 10 of the present invention will account for the increased tendency of the circular grommet 10 to spin within the aperture 12.

The inner sleeve 26 is secured within the outer sleeve 28 in such a manner as to resist the torque forces applied thereto by the fastener 18. However, where the torque applied to the inner sleeve 26 by the fastener 18 exceeds a predetermined threshold level referred to as the release torque, the inner sleeve 26 will begin to rotate within the outer sleeve 28 to the extent necessary to relieve the torque forces applied to the inner sleeve 26 that exceed the predetermined release torque levels. Note that the release torque levels are set so as to be higher than the torque level required to securely clamp the secondary panel 16 to the primary panel 14 under the influence of the fastener 18 but below the torque level at which the bore 22 will be stripped by the fastener 18. To ensure that the inner sleeve 26 is retained within the outer sleeve 28 regardless of whether the release torque has been exceeded, it is preferred to form an outwardly extending flange 40 into the exterior of the inner sleeve 26. This outwardly extending flange is preferably located away from the head 36 of the grommet 10 within the shank 30 thereof. The flange 40 is received within a complementary groove or channel 42 formed on the interior of the outer sleeve 28. The interlocking action of the flange 40 and channel 42 prevent the inner sleeve 26 from being extracted from the exterior sleeve 28 of the grommet 10 even after the release torque has been exceeded.

The magnitude of the release torque is dictated by the hold that the outer sleeve 28 has on the inner sleeve 26. This hold or grasp may be created by the use of adhesives between the inner and outer sleeves 26, 28, by forming mechanical torque resisting structures therebetween, or even by mechanically or thermoplastically deforming the inner and outer sleeves 26, 28 to prevent the rotation of the inner sleeve 26 within the outer sleeve 28. In the preferred embodiment illustrated in the Figures, rotation of the inner sleeve 26 within the outer sleeve 28 is prevented by a series of longitudinal grooves 44 formed into the exterior of the inner sleeve 26. These grooves 44 engage grooves or projections (not shown) that are formed on the interior surface of the exterior sleeve 28. As can be appreciated from FIG.

3, these grooves 44 may be formed to resist rotation of the inner sleeve 26 to a greater degree in one rotation direction than in the other. For instance, because the grooves 44 illustrated in FIG. 3 are of a saw-tooth shape that is inclined to the left, a fastener 18 that is drive into the bore 22 of the inner sleeve 26 in the typical clockwise rotation, will experience a lower release torque than if the same fastener 18 were rotated in a counter-clockwise direction. The structure of the grooves 44 illustrated in FIG. 3 is such that a fastener 18 may be backed out of the bore 22 even after the release torque has been exceeded. The release torque may be advantageously specified at a level that permits a desired clamping force to be exerted upon a secondary panel or other structure 16 that is to be secured to the primary panel 14 by the fastener 18. Once the predetermined clamping force of the fastener 18 upon the panel 16 is achieved, the torque applied to the inner sleeve 26 by the fastener will exceed the release torque of the inner sleeve 26. Consequently, the inner sleeve 26 will rotate with respect to the router sleeve 28 and stripping of the bore 22 by the threads of the fastener 18 will be avoided. This is particularly useful where fastener-driving tools such as a portable hand-held drill are used to drive a fastener 18 into the grommet 106 As a result of the spinning action of the inner sleeve 26 within the outer sleeve 28, a driving tool such as a hand-held drill may be used at :virtually any torque setting to rapidly drive a fastener 18 into the grommet in without fear of stripping the bore 22 formed into the grommet 10

In an alternate embodiment of the grommet 10, the inner sleeve 26 may be constrained not to rotate, or may be fashioned so as to have a very high release torque. The low insertion force requirement engendered by the relatively soft outer sleeve 28 combined with the strip resistant harder inner sleeve 26 yield a useful result even where the inner sleeve 26 is not free to rotate within the outer sleeve 28.

Note that while the grommet 10 of the present invention has been described in conjunction with the attachment of a secondary panel or other structure 16 to a primary panel 14 of an automobile frame or the like, it is to be understood that the grommet 10 of the present invention may be adapted for use in many manufacturing settings. Accordingly, the present invention is not to be so limited. Furthermore, the grommet 10 of the present invention may be used as illustrated in the figures or may be formed as part of a larger, extended structure.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed Without departing from the invention, which is defined by the claims.

What is claimed is:

1. A grommet comprising:
   an outer sleeve having a shank and a head, the head extending laterally from an end of the shank, the shank being constructed and arranged for retained insertion in an aperture formed in a structure, the head acting to limit the insertion of the shank into the aperture; and,
   an inner sleeve disposed within the shank of the outer sleeve and having a bore formed therein that is constructed and arranged to threadedly receive a threaded fastener, the inner sleeve being releasably secured within the outer sleeve such that a release torque at which the inner sleeve is caused to rotate within the outer sleeve is lower than a strip torque at which a threaded fastener may be caused to spin freely within the inner sleeve.

2. The grommet of claim 1 wherein said shank has a cross-sectional shape that is complementary to the aperture of the structure into which the grommet is inserted, the shank of the grommet being constructed and arranged to resist spinning within the aperture.

3. The grommet of claim 1 wherein the shank further includes at least one retaining structure extending from the outer surface of the shank for retaining the grommet within the aperture in the structure.

4. The grommet of claim 3 wherein said retaining structure comprises one of a group consisting of a vane, a flexible finger, a ramped projection, an outwardly extending ridge, and a plurality of annular projections.

5. The grommet of claim 1 wherein the inner sleeve has a laterally projecting collar extending from a bottom end thereof, said collar being retained within a complementarily shaped channel in the outer sleeve, such that the inner sleeve is positively retained within the outer shell.

6. The grommet of claim 1 wherein the inner sleeve is fashioned of a relatively harder material and the outer sleeve is fashioned of a relatively softer material.

7. The grommet of claim 1 wherein the inner sleeve is adhered to the outer sleeve to prevent relative rotation therebetween.

8. The grommet of claim 1 wherein the inner sleeve is mechanically secured to the outer sleeve so as to prevent relative rotation therebetween.

9. The grommet of claim 1 wherein the exterior surface of the inner sleeve has formed therein at least one projection that contacts the outer sleeve in such a manner as to prevent relative rotation therebetween.

10. The grommet of claim 1 wherein the inner sleeve is formed prior to the outer sleeve, and the outer sleeve is subsequently over-molded around the inner sleeve.

11. The grommet of claim 1 wherein the inner sleeve is formed within the outer sleeve subsequent to the molding of the outer sleeve.

12. The grommet of claim 1 wherein the inner sleeve and outer sleeve are formed independent of one another and subsequently assembled.

13. The grommet of claim 1 wherein the outer surface of the inner sleeve has formed therein a plurality of projections having a lower release torque in a clockwise direction and a higher release torque in a counter-clockwise direction.

14. The grommet of claim 1 wherein the outer surface of the inner sleeve has formed therein a plurality of projections having a lower release torque in a counter-clockwise direction and a higher release torque in a clockwise direction.

15. A torque resistant grommet comprising:
   a shank having a center core encapsulated within an outer layer, the shank having a distal end and an upper end, the upper end of the shank having a head extending laterally therefrom, the grommet having an aperture formed longitudinally through the head and the core of the shank sized so as receive therein a fastener, the core of the shank and the outer layer of the shank being connected to one another in such a way as to exhibit a failure in the connection therebetween at a predetermined torque level, wherein the shank has a cross-sectional shape that is complementary to an aperture in a structure into which the grommet is inserted, the grommet being adapted to resist spinning within the aperture.

16. The torque resistant grommet of claim 15 wherein the shank of the grommet is constructed and arranged to resist spinning within the aperture.

17. The torque resistant grommet of claim 15 wherein the shank further includes at least one retaining structure extending from the outer surface of the shank for retaining the grommet within the aperture in the structure.

18. The torque resistant grommet of claim 17 wherein said retaining structure comprises one of a group consisting of a vane, a flexible finger, a ramped projection, an outwardly extending ridge, and a plurality of annular projections.

19. The torque resistant grommet of claim 16 wherein the aperture formed in the structure is non-circular and the shank of the grommet is formed to fit therein in a complementary manner.

20. The torque resistant grommet of claim 16 wherein a threaded fastener received within the center core of the shank causes at least some portion of the shank to expand, thereby securing the grommet within the aperture formed in the structure.

21. A torque limiting grommet comprising:
an elongate fastener sleeve having a top end and a bottom end, the elongate fastener sleeve having a bore formed therein from the top end thereof that is constructed and arranged to receive a threaded fastener;
an outer aperture sleeve formed around the fastener sleeve, the exterior of the aperture sleeve being constructed and arranged to be received in an aperture in a structure, the aperture sleeve further comprising at least one retaining mechanism that is constructed and arranged to retain the aperture sleeve within the aperture
head extending laterally from the outer aperture sleeve that limits the depth to which the outer aperture sleeve may be inserted into the aperture; and,
wherein the fastener sleeve is secured within the aperture sleeve such that a torque applied to the fastener sleeve by the threaded fastener will cause the fastener sleeve to spin within the aperture sleeve without becoming dislodged therefrom.

22. The torque limiting grommet of claim 21 wherein the fastener sleeve further comprises a flange extending laterally from the bottom end thereof, the flange being received in a complementary channel formed in the interior of the fastener sleeve, the flange of the fastener sleeve securely retaining the fastener sleeve within the aperture sleeve.

23. The torque limiting grommet of claim 21 wherein the outer surface of the fastener sleeve has formed therein at least one projection that contacts the inner surface of the aperture sleeve in such a way as to prevent rotation of the fastener sleeve within the aperture sleeve below a predetermined release torque threshold.

24. The torque resistant grommet of claim 21 wherein said retaining structure comprises one of a group consisting of a vane, a flexible finger, a ramped projection, an outwardly extending ridge, and a plurality of annular projections.

25. The torque resistant grommet of claim 21 wherein the fastener sleeve is formed of a material that is relatively harder and the aperture sleeve formed of a material that is relatively softer.

26. A torque limiting grommet comprising:
an elongate fastener sleeve having a top end and a bottom end, the elongate fastener sleeve having a bore formed therein from the top end thereof that is constructed and arranged to receive a threaded fastener, the fastener sleeve also having a flange extending laterally from the bottom end thereof;
an outer aperture sleeve formed around the fastener sleeve, the exterior of the aperture sleeve being constructed and arranged to be received in an aperture in a structure, the aperture sleeve further comprising at least one retaining mechanism that is constructed and arranged to retain the aperture sleeve within the aperture, the aperture sleeve having formed on an interior surface a channel that is complementary with the flange of the fastener sleeve, the flange of the apertures sleeve being received in the complementary channel of the fastener sleeve so as to securely retaining the fastener sleeve within the aperture sleeve;
at least one projection extending from the exterior surface of the fastener sleeve that contacts the inner surface of the aperture sleeve in such a way as to prevent rotation of the fastener sleeve within the aperture sleeve below a predetermined release torque threshold;
the fastener sleeve being formed of a material that is relatively harder and the aperture sleeve formed of a material that is relatively softer; and,
a head extending laterally from the outer aperture sleeve that limits the depth to which the outer aperture sleeve may be inserted into the aperture.

27. A grommet comprising:
an outer sleeve having a shank and a head, the head extending laterally from an end of the shank, the shank being constructed and arranged for retained insertion in an aperture formed in a structure, the head acting to limit the insertion of the shank into the aperture; and
an inner sleeve disposed within the shank of the outer sleeve and having a bore formed therein that is constructed and arranged to threadedly receive a threaded fastener, the inner sleeve being secured within the outer sleeve, the inner sleeve being fashioned of a relatively harder material and the outer sleeve being fashioned of a relatively softer material, the inner sleeve further being fashioned of a material softer than the threaded fastener such that the threaded fastener can cut threads into an interior surface of the bore.

* * * * *